Feb. 19, 1963 S. J. SINER ET AL 3,077,639

SEALING MEANS AND METHOD OF SEALING

Filed Aug. 3, 1959

INVENTORS
STEPHEN J. SINER AND
VINCENT SUSSMAN
BY Harry G. Shapiro
ATTORNEY

United States Patent Office 3,077,639
Patented Feb. 19, 1963

3,077,639

SEALING MEANS AND METHOD OF SEALING

Stephen Jay Siner, Maplewood, and Vincent Sussman, Union, N.J., assignors to Joseph Waldman & Sons, Irvington, N.J., a limited partnership Filed Aug. 3, 1959, Ser. No. 831,115
11 Claims. (Cl. 18—59)

The invention relates to the sealing of components within casings or housings for their protection against the effects of environmental conditions, and other ill-effects of a chemical and phisical nature. The invention is more particularly directed to improved methods and means for the protective sealing of electrical or electronic components of the type which require an adjoining space for at least a portion of the component to permit the component to operate satisfactorily.

These are various electrical and electronic components, such as rectifiers, switches, potentiometers, relays, etc., which cannot be directly potted or embedded in a protective sheath or mass of encapsulating material, because the component has a part thereof which requires an adjoining area or space to allow the part to move freely. Nevertheless, it is desirable to encase or house such type of component to protect it against physical stresses, such as shock or impact, and the environmental conditions which the component may encounter in use. This is particularly true in numerous military applications where the components are miniaturized and included in electronic systems which must withstand the severe stresses imposed by widely disparate environmental conditions.

Electrical and electronic components of the type under consideration have been housed in metal, molded plastic and ceramic casings. In order to seal the component within the casing, it has been the practice to close off the open end of the casing, or the area placing the interior of the casing in communication with the ambient atmosphere, with a liquid resinous material or sealant. The liquid resin sealant may require the application of heat to effect its hardening or curing. In heating, the air within the casing expands, and the expanding air in the otherwise sealed casing flows through the liquid sealant before the sealant is fully hardened. As a result, the air forms bubbles in the sealing material, is entrapped, and causes the resulting seal to be porous and imperfect; the measure of protection desired for the contained or encased component is not obtained. Where, as is preferred, a thermosetting resin composition is used as the liquid sealant, the cured resin cannot be reactivated or softened for reworking. Then, the imperfectly sealed casing must be carefully broken away to salvage the contained component. The percentage of rejects is high and costly. The term "electrical component" as hereinafter used in the specification and claims is intended to include an equivalent electronic component.

An object of the invention is to provide an improved method for effectively sealing an electrical component of the type which requires an adjoining space for the suitable operation of the component.

Another object of the invention is to effectively seal components of the type under consideration in a procedurally simple and improved manner, the sealant, like the casing and the component, being an easily handled solid part, thereby enabling the casing, component and sealant to be assembled, and the component to be sealed in the casing with a minimum of effort and skill.

Still another and important object of the invention is to provide a synthetic resin composition which is solid in form and has a configuration or shape which will enable an electrical component of the type under consideration to be sealed in a casing so that the resulting seal will be continuous or non-porous. Moreover, the initially solid state sealant, upon heating, furnishes a predetermined amount of hardenable liquid sealing material, thereby eliminating the rather fussy manipulation required to handle a liquid form of sealant, and eliminating the attendant problem of metering a correct amount of the liquid sealant for the area to be sealed.

These, and other objects and advantages of the invention will be apparent from the following detailed description.

In accordance with the invention generally, a component is first assembled with or disposed within a casing, can or housing. The component may be any electrical or electronic device which has a movable part or parts to be located within the casing. The casing may be of metal, molded plastic or ceramic material, and possesses internal dimensions which permit the component to be housed therein with an adjoining space to allow for the movement of the component's movable part. The casing, or the assembly of the casing and component, has an area or opening to be sealed which places the interior of the casing in communication with the ambient atmosphere. The area to be sealed may be situated between a solid or immobile part of the component and an adjacent portion of the casing wall or, a lid or cover may be provided for the open end of a casing within which the component is entirely contained or housed. In the latter instance, the cover will fit the casing with some clearance, and when heat is used to effect the sealing of the cover and casing to one another, the air within the casing tends to expand and escape to the ambient atmosphere through such clearance or opening between the parts. The conductors or leads of the electrical component extend exteriorly of the casing. A lead or leads may be located in the area to be sealed, or the lead may be elsewhere located and already sealed at that portion of the casing wall through which it extends.

For sealing the area which places the interior of the casing in communication with the ambient atmosphere, the sealant of the invention comprises a preformed or solid mass of a synthetic resin composition which melts or is liquefiable upon the application of heat, and is hardenable again to a solid state. The quantitative mass or weight of the initially solid sealant is selected to furnish, upon heating, a predetermined amount of the melted or liquid sealing material, the amount depending upon the particular size or volume of the area to be sealed.

The solid sealant is formed, shaped or molded to furnish a configuration or contour which, upon the positioning of the solid piece at the area to be sealed and heating, will allow the air, caused to expand in the casing upon the application of heat, to escape through the area being sealed prior to the sealing thereof. The solid sealant may be variously shaped or contoured to accomplish this purpose, the particular contour depending upon the shape or outline of the area to be sealed. The solid sealant possesses a contour which exposes at least a portion of the area to be sealed to allow the heated and expanding air to be vented to the ambient atmosphere before the solid sealant liquefies sufficiently to flow over and seal the open area. Then, the fully liquefied sealant completely covers the area to be sealed, and becomes completely solidified into adhered, sealed relationship with respect to the adjacent casing wall. Preferably, the solid sealant is shaped to also assist in maintaining the desired positional relationship of the sealant with respect to an adjacent portion of the component or components with which it is assembled.

In greater detail, reference is made to the accompanying drawing, in which.

Figure 8:
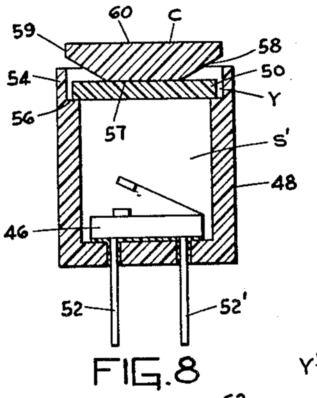
FIG. 8 is a vertical cross-sectional view illustrating an arrangement for sealing a cover to a casing having an electrical component disposed therein, this view illustrating still another form of solid sealant.
Figure 10:
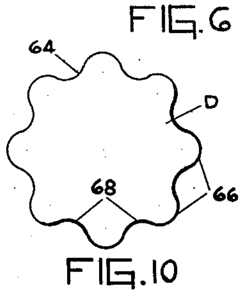
FIG. 10 is a top plan view of another form of solid sealant suitable for securing and sealing a cover and casing to one another.
Figure 11:
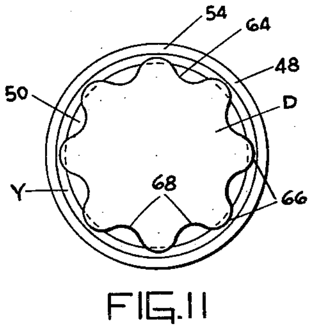
Figure 12:
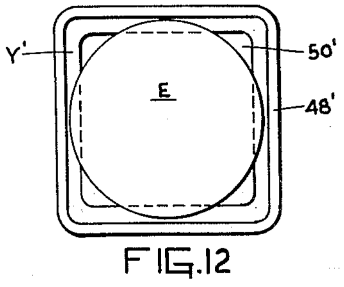

FIG. 11 is a top plan view showing the form of solid sealant illustrated in FIG. 10 assembled with a casing and cover related as shown in FIG. 8, preliminary to the application of heat to seal the casing and cover to one another; and FIG. 12 is a top plan view similar to FIG. 11 illustrating another form of solid sealant assembled with a casing and cover which are substantially rectilinear or square in outline.

Figures 1, 2, 3, 5:
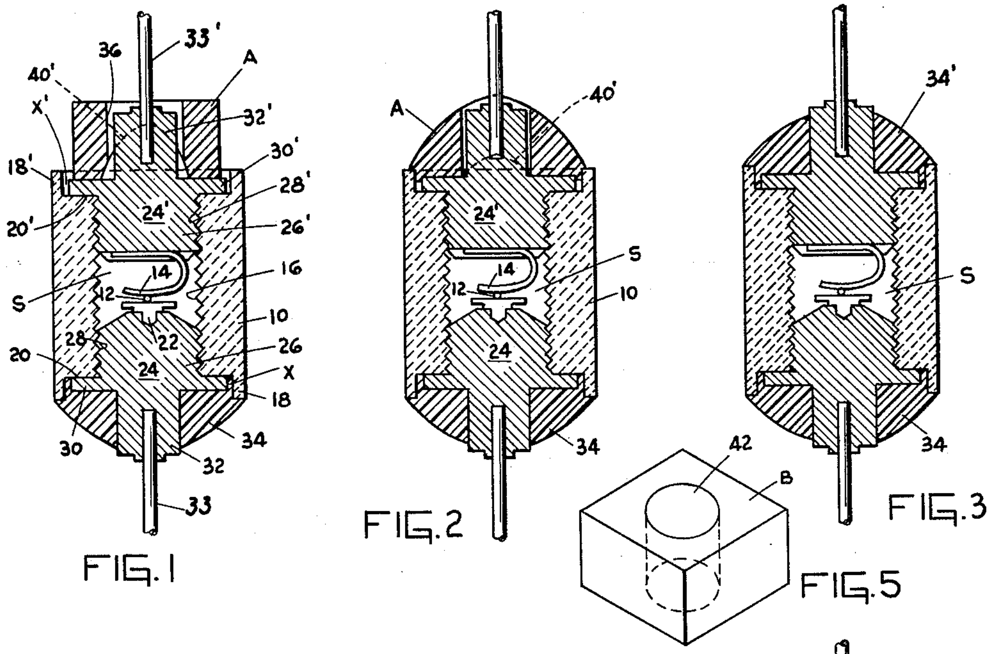
FIG. 1 is a vertical, cross-sectional view showing a solid sealant made in accordance with one form of the invention arranged for sealing a silicon rectifier and a related casing therefor.
FIG. 2 is a view similar to FIG. 1 showing the condition of the solid sealant after heat has been applied, but before sealing has been completed.
FIG. 3 illustrates the completely sealed assembly.
FIG. 5 is a perspective view of a solid sealant having a contour in accordance with another form of the invention, such sealant form being suitable for sealing an area such as provided by a casing and an electrical component related to one another as shown in FIG. 1.

FIGS. 1 to 3 illustrate the invention with relation to the sealing of a silicon rectifier. It will be understood, however, that the particular electrical component is for illustrative purposes only; other electrical or electronic devices may be similarly sealed or protectively encased. In this illustrated example of the invention, a casing 10 of electrically insulating material, for example a ceramic, is provided to house a silicon crystal 12 and a cooperating spring contact 14. The casing is a hollow, cylindrical member, which is internally threaded at 16. The ends of the casing are provided with longitudinally extending, circumferential lips 18, 18', and internally adjacent, radially extending shoulders 20, 20', respectively.

The silicon crystal 12 is mounted on a metal base 22, which in turn is secured to an electrode 24. The electrode has a solid cylindrical portion 26, which is externally threaded at 28 for mating engagement with the internally threaded portion 16 of the casing. The electrode has a radially extending flange 30 of a diameter slightly less than the internal diameter of the casing's lip 18 to permit the flange to be seated against the shoulder 20. An upstanding, central boss 32 extends from the flanged portion of the electrode, and a conductor or lead 33 is secured with the boss, and the exposed end of the electrode. The spring contact 14 is mounted upon the inner end of a similar electrode 24', like portions of the electrode being designated by the same primed reference numerals.

When the electrodes 24, 24' are assembled with the casing, as shown in FIG. 1, the cooperating crystal and spring contact have an adjacent air space S. The clearances may be quite small between the mating thread portions 16, 28 and 16, 28', and the adjoining surfaces provided by the shoulders and flanges 20, 30 and 20', 30'. Such clearances may be due to the usual tolerances of economical manufacture, which does not permit high precision, extremely smooth surface finishing. The peripheral edges of the flanges 30 and 30' are spaced from the internal surfaces of the lips 18, 18', respectively, because some clearance is necessary to permit the flanges to by-pass the lips as the electrodes are screwed into the casing to seat the flanges against the shoulders. As a result, the interior air space S is placed in communication with the ambient atmosphere at the small circular openings or seams X and X', shown on a somewhat exaggerated scale in FIG. 1.

Sealing one end of the casing and silicon rectifier assembly does not present any particular problem insofar as continuity of the seal is concerned. For example, and as shown in FIG. 1, applying a metered quantity of liquid thermosetting resin to surround the electrode boss 32 and heating to cure, will furnish a satisfactory seal 34 closing the opening X. Of course, the assembly is oriented so that the electrode 24 is in the top position when coated with the liquid sealant, and placed in an oven, or otherwise heated, to cure the sealant. After sealing one end of the assembly however, there is only one path for the air within the assembly, and in the space S, to flow when caused to expand and seek an area of exit upon heating to cure a resin applied to the opposite end of the assembly; such path leads to the ambient atmosphere at the opening X'.

Figure 4:
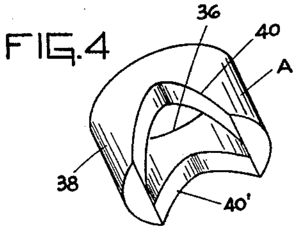
FIG. 4 is a perspective view of the initially solid sealant used in the assembly of FIG. 1.

In accordance with the invention, to seal the area X', a preformed, solid sealant member or pellet A having a contour, as shown in FIG. 4, is positioned with relation to the electrical component and casing assembly, as shown in FIG. 1. The solid sealant is in the form of an annular ring having a central opening 36 to permit positioning the member to surround the boss 32' with a slight amount of clearance. The cylindrical wall 38 of the solid sealant ring is provided with a notch which is generally V- or U-shaped. Preferably, and as shown, a pair of notches 40, 40' are provided in the diametrically opposite sides of the ring wall. In positioning the solid sealant member on the casing-electrical component assembly, the member is oriented so that the open ends of the notches are located on the lower side, facing the opening X'.

The notched solid sealant ring member comprises a thermosetting resin composition which is solid at room temperature, and which will liquefy and cure to a hardened state upon the application of heat. Preferably, the composition permits liquefaction and curing with heat alone, without necessitating the application of pressure. Examples of suitable resin compounds having such characteristics are the epoxy resins, polyesters, allyl esters and polyurethanes. The thermosetting resin composition includes a suitable curing agent, and may further include suitable fillers and other modifying agents to enable the solid sealant to furnish upon heating, a hardenable or curable liquid which possesses the desired electrical, physical and chemical properties.

In accordance with the preferred form of the invention, the preformed, solid sealant A is made of an epoxy resin composition having a predetermined and measured amount or weight in order to supply the desired quantity of liquid sealant at the area to be sealed. A suitable formulation is as follows, the amounts indicated being in parts by weight:

| | |
|---|---|
| Epoxy resin | 100 |
| Filler | 50 |
| Curing agent | 30 |

An epoxy resin (a reaction product of bisphenol A and epichlorhydrin) is used which preferably has an epoxy equivalent of approximately 400 to 525, or a melting point of approximately 60 to 75° C. A suitable curing agent is phthalic anhydride, and the filler may be slate powder of approximately 200 mesh. It will be understood that any desired filler or fillers may be used, and that the curing agent may be any of the known epoxy resin hardeners. The proportions of the composition's ingredients may be varied to suit.

The epoxy resin, which is solid at room temperature, is melted by heating to a temperature of approximately 120° C., whereupon the slate powder is added and mixed with the liquid resin. The phthalic anhydride is then blended in, and the ingredients mixed for approximately 10 to 15 minutes. The mixture while hot, is poured into pans and cooled to a solid state, following which, it is broken into lumps and pulverized. The resultant powder is then compressed into individual, preformed pellets having the shape shown in FIG. 4 to provide a solid solution state of the composition. The shaping or compression of the powder may be accompanied with the aid of a slight degree of heat. The solid form of thermosetting resin sealant is still thermosplastic, and will melt or liquefy at a temperature of between approximately 120 to 150° C. before beginning to gel and cure.

While the epoxy resin used is preferably solid at room temperature, an epoxy resin compound which is liquid at room temperature may be used, whereupon it is necessary to partially cure the resin before powdering and compressing to shape. An epoxy resin compound which is initially solid at room temperature, provides a solid sealant of more extended shelf-life, and is preferred.

With the shaped solid sealant member A in the position shown in FIG. 1, heat is applied at a temperature to cause the solid solution state of the thermoplastic, yet thermosetting member, to melt. The heat is preferably applied by positioning a number of the assemblies, as shown in FIG. 1, in a rack, and placing the racked assemblies in an oven. As an assembly is heated, the heated, expanding air within the casing flows through the opening area X′ before the solid state sealant melts and completely covers the opening. Thus, the expanding air cannot form bubbles in the melted or liquid sealant to impair the seal. This is accomplished by virtue of the notched configuration of the solid sealant. Heating causes the solid sealant to slump into the notched areas, as shown in FIG. 2. The expanding air is vented to the ambient atmosphere before the sealant is sufficiently liquefied and collapses completely into the notched areas and completely covers the opening X′. Continued heating causes the now liquid sealant to gel and harden to provide the continuous, non-porous seal 34′. With a solid sealant of an epoxy resin composition as above described, curing of the liquefied resin is completed in approximately 3 hours at a temperature of approximately 150° C. At 120° C., a longer period is needed.

Figure 6:
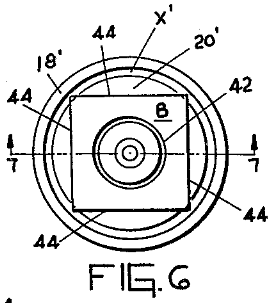
FIG. 6 is a top plan view showing the form of solid sealant illustrated in FIG. 5 assembled with the casing and component preliminary to the application of heat to effect sealing.
Figure 7:
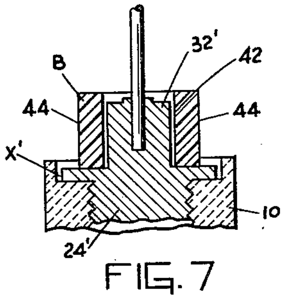
FIG. 7 is a partial, vertical cross-sectional view taken approximately in the plane of line 7—7 of FIG. 6.

The solid sealant may be made in a variety of different shapes or contours to achieve a continuous and non-porous seal for a casing and electrical component assembly of the type shown in FIG. 1. As shown in FIG. 5, the solid state thermoplastic sealant of a thermosetting resin composition, designated B, may be in the form of an apertured cube. The cube has a central opening 42 to allow the piece to be fitted over the central boss 32′ of the electrode 24′, as shown in FIG. 7. As shown in FIG. 6, the corners of the solid sealant B may be located closely adjacent the inner wall of the circumferential lip 18′. The rectilinear sides 44 of the cube-shaped sealant however, are spaced inwardly of the circular opening X′ for most of the opening's circumference. As a result, when heat is applied to the assembly, the expanding air within the assembly is vented to the ambient atmosphere through the exposed portion of the opening before the solid state resin sealant melts and flows sufficiently to close off the opening. With continued heating, the same kind of continuous seal of hardened resin is obtained as shown at 34′ in FIG. 3.

Figure 9:
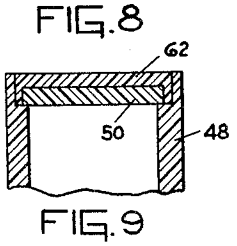
FIG. 9 is a partial, vertical cross-sectional view showing the cover and casing arrangement of FIG. 8 completely sealed to one another.

FIGS. 8 and 9 illustrate the invention with regard to the sealing of an electrical component 46 disposed within a can or casing 48, which is to be closed off from the ambient atmosphere by a cover 50. The electrical component, which is diagrammatically illustrated, may be a switch or any other kind of component which requires an adjacent area S′ for the suitable operation of the working or moveable part or parts thereof. The component has a pair of leads 52, 52′ which extend through the bottom wall of the casing and are sealed to the wall by any suitable bonding material, and the component itself may be adhered to the inner surface of the bottom wall. A suitable bonding material for these purposes may be epoxy resin composition. The casing may be of any suitable material such as metal, ceramic or molded plastic. Preferably, the casing is molded of an epoxy resin composition.

At its upper end, the casing 48 has a longitudinally extending, circumferential lip 54 located above an internal, radially extending shoulder 56. The cover or disk 50, which also is preferably of an epoxy resin composition, is positioned to rest upon the shoulder 56. The height of the cover disk is less than the height of the lip 54. A slight amount of clearance between the peripheral edge of the cover and the internal wall of the lip 54 is, of course, necessary in order to allow the cover to be placed in position. Such clearance provides an opening, designated Y, through which the air within the casing may flow when heat is applied to the assembly, and which will cause the air in the space S′ to expand.

As shown in FIG. 8, a solid sealant C having a substantially frusto-conical configuration is placed upon the cover with the side 57 of smaller dimension in contact with the top of the cover. The downwardly convergent side 58 of the solid sealant member is spaced from and exposes the opening Y in the initial assembly of the parts. To prevent breaking or chipping, the peripheral edge 59 is given a measure of thickness instead of being sharply feathered at the intersection of the side 58 with the base 60. When heat is applied to liquefy such form of solid sealant, the expanding air escapes through the opening Y before the melting and slumping sealant completely covers the opening. Upon continued heating, the sealant is cured to a solid state to provide the seal 62, as shown in FIG. 9. The cured resin sealant also fills out the area within the lip 54 and above the cover 50. By using a solid member of the described contour having a predetermined weight, the resultant hardened resin furnishes an effective seal and a smooth, filled casing at the cover end.

FIGS. 10 and 11 illustrate another configuration of solid sealant suitable for sealing a cover to a casing containing an electrical component as shown in FIG. 8. The solid sealant member, designated D, is in the form of a flat disk having a scalloped edge 64. This form of solid sealant has the advantage over the form C in that its full external diameter, circumscribed by the extremities 66, assists in positioning the disk with relation to the casing and cover; the extremities, with some slight clearance, closely abut the inner wall of the lip 54. The relieved portions 66 expose substantial portions of the opening Y, and allow the expanding air within the casing to escape before the solid sealant, in melting, flows over the opening, fills out the area above the cover and seals the cover in position, as previously shown in FIG. 9.

It will be understood that by providing a central opening through the member C or D, such apertured forms of solid sealant may be used to seal an assembly of casing and electrical component of the type as shown in FIGS. 1 to 3. Also, the sealant member B, with or without the aperture, and having a circumscribed diameter to fit within the internal diameter provided by the lip 54, while exposing portions of the area Y, may be used to seal such area in the casing and cover assembly of FIG. 8. Such cube form of solid sealant would, of course, have a weight to furnish the desired quantity of liquid sealant.

Where the horizontal cross-section of the casing is substantially rectilinear or square, as shown in FIG. 12, and the cover is of similar outline, a solid sealant member in the form of a circular disk E may be used. As shown, the disk has a diameter slightly less than the inscribed diameter at the open end of the square casing 48′, thereby exposing the opening Y′ at substantial areas when the disk is positioned on the cover 50′, preliminary to heating. When heat is applied, the expanding air in the casing escapes to the ambient atmosphere through the exposed areas of the opening prior to the liquefied sealant, which is supplied by the solid disk, flowing over and sealing the exposed areas, and adhering the cover to the casing.

It is believed that the advantages of the invention will be apparent from the foregoing detailed description of several preferred embodiments of the invention. The described method of sealing is procedurally simple. The sealant, like the casing and the component, is a solid piece, which is easily handled in assembling the parts for processing. Effective seals are obtained with a minimum of rejects due to the seals having air bubbles therein. Effective seals are obtained by simply relating the contour and quantity of the solid sealant to the shape and area to be sealed. It will be understood that various modifications and changes may be made without departing from the spirit and scope of the invention as sought to be defined in the following claims.

We claim:

1. A method of sealing an electrical component in a casing which is closed except at an area which places the interior of the casing in communication with the ambient atmosphere, the component to have an adjoining space in the casing free of sealing material, said method comprising positioning in supported relationship adjacent to said area a solid sealant of a hardenable resin composition liquefiable upon the application of heat, said solid sealant having a contour which is non-conforming with respect to said area to expose a portion thereof to allow air in the casing, caused to expand upon the application of heat, to escape through said area before the liquid, supplied by heating the solid sealant, flows over said area, and heating the solid sealant to cause its liquefaction to seal said area after the air has escaped through said area.

2. A method of sealing an electrical component in a casing which is closed except at an area which places the interior of the casing in communication with the ambient atmosphere, the component to have an adjoining space in the casing free of sealing material, said method comprising positioning in supported relationship adjacent to said area a solid sealant of a thermosetting resin composition liquefiable and curable upon the application of heat, said solid sealant having a contour which is non-conforming with respect to said area to expose a portion thereof to allow air in the casing, caused to expand upon the application of heat, to escape through said area before the liquid, supplied by heating the solid sealant, flows over said area, said solid sealant having a contour to maintain it in assembled relation with respect to the casing, and heating the solid sealant to cause its liquefaction and curing to seal said area after the air has escaped through said area.

3. A method of sealing an electrical component in a casing which is closed except at an area which places the interior of the casing in communication with the ambient atmosphere, said area being provided by the clearance between the casing and a cover, said casing having a longitudinally extending lip at one end thereof and an adjacent internal shoulder upon which the cover is positioned, the component to have an adjoining space in the casing free of sealing material, said method comprising positioning upon said cover a solid sealant of a thermosetting resin composition liquefiable and curable upon the application of heat, said solid sealant having a contour which is non-conforming with respect to said area to expose a portion thereof to allow air in the casing, caused to expand upon the application of heat, to escape through said area before the liquid, supplied by heating the solid sealant, flows over said area, and heating the solid sealant to cause its liquefaction and curing to seal said area after the air has escaped through said area and to adhere the cover to the casing.

4. A method of sealing an electrical component in a casing which is closed except at an area which places the interior of the casing in communication with the ambient atmosphere, said area being provided by the clearance between the casing and a cover, said casing having a longitudinally extending lip at one end thereof and an adjacent internal shoulder upon which the cover is positioned, the component to have an adjoining space in the casing free of sealing material, said method comprising positioning upon said cover a solid sealant of a thermosetting resin composition liquefiable and curable upon the application of heat, said solid sealant having a contour which is non-conforming with respect to said area to expose a portion thereof to allow air in the casing, caused to expand upon the application of heat, to escape through said area before the liquid, supplied by heating solid sealant, flows over said area, said solid sealant having a contour to maintain it in assembled relation with respect to said casing and cover, and heating the solid sealant to cause its liquefaction and curing to seal said area after the air escaped through said area and to adhere the cover to the casing.

5. A method of sealing an electrical component in a casing which is closed except at an area which places the interior of the casing in communication with the ambient atmosphere, said area being provided by the clearance between the casing and a cover, said casing having a longitudinally extending lip at one end thereof and an adjacent internal shoulder upon which the cover is positioned, the component to have an adjoining space in the casing free of sealing material, said method comprising positioning upon said cover a solid sealant disk of a thermosetting resin composition liquefiable and curable upon the application of heat, said sealant disk being formed and dimensionally related to the internal surface of the lip and said area so that a portion thereof is positioned closely adjacent the lip and another portion thereof exposes said area to allow air in the casing, caused to expand upon the application of heat, to escape through the exposed area before the liquid, supplied by heating the disk, flows over said area, and heating the solid sealant to cause its liquefaction and curing to seal said area after the air escaped through said area and to adhere the cover to the casing.

6. A method of sealing an electrical component in a casing which is closed except at an area which places the interior of the casing in communication with the ambient atmosphere, said area being provided by the clearance between an immobile portion of the component and the casing, said immobile portion having a conductor extending therefrom exteriorly of the casing, the component to have an adjoining space in the casing free of sealing material, said method comprising positioning in supported relationship adjacent to said area and to surround a portion of said conductor a solid sealant of a thermosetting resin composition liquefiable and curable upon the application of heat, said solid sealant having a contour which is non-conforming with respect to said area to expose a portion thereof to allow air in the casing, caused to expand upon the application of heat, to escape through said area before the liquid, supplied by heating the solid sealant, flows over said area, said solid sealant having a contour to maintain it in assembled relation with respect to the casing and immobile portion of the component, and heating the solid sealant to cause its liquefaction and curing to seal said area after the air escaped through said area and to adhere the immobile portion of the component to the casing.

7. A method as set forth in claim 6, wherein the solid sealant comprises a ring member having a generally U-shaped notch in the wall thereof, the ring member being positioned with the open end of the notch facing the casing.

8. An article for sealing an electrical component in a casing which is closed except at an area which places the interior of the casing in communication with the ambient atmosphere, said article comprising a solid sealant of a thermosetting resin composition liquefiable and curable upon the application of heat, said solid sealant being in the form of a ring member having a generally U-shaped notch in the wall thereof.

9. An article as set forth in claim 8, wherein the solid sealant ring member has a pair of generally U-shaped notches formed in the ring wall at substantially diametrically opposite sides thereof.

10. A method of sealing an electrical component as set forth in claim 5, wherein the casing, cover and solid sealant disk are each formed of an epoxy resin composition, the disk being liquefiable and curable at a temperature of between approximately 120° and 150° C.

11. An article for sealing an electrical component as set forth in claim 8, wherein the solid sealant ring member comprises an epoxy resin composition liquefiable and curable at a temperature of between approximately 120° and 150° C.

References Cited in the file of this patent

UNITED STATES PATENTS

| | | |
|---|---|---|
| 1,593,525 | Copeland | July 20, 1926 |
| 2,033,643 | Neill | Mar. 10, 1936 |
| 2,526,688 | Robinson et al. | Oct. 24, 1950 |
| 2,527,373 | Parson | Oct. 24, 1950 |
| 2,546,208 | Barton | Mar. 27, 1951 |
| 2,596,134 | Dorst | May 13, 1952 |
| 2,713,700 | Fisher | July 26, 1955 |
| 2,792,271 | Beggs | May 14, 1957 |
| 2,882,116 | Williams | Apr. 14, 1959 |
| 2,883,592 | Burton et al. | Apr. 21, 1959 |
| 2,904,618 | Robinson et al. | Sept. 15, 1959 |
| 2,910,338 | Yoder | Oct. 27, 1959 |
| 2,922,832 | Gottschall et al. | Jan. 26, 1960 |
| 2,997,414 | Netherwood et al. | Aug. 22, 1961 |

FOREIGN PATENTS

| | | |
|---|---|---|
| 779,587 | Great Britain | July 24, 1957 |

OTHER REFERENCES

"Electronic Design," Jan. 22, 1958, page 10.